US008010460B2

(12) United States Patent
Work et al.

(10) Patent No.: US 8,010,460 B2
(45) Date of Patent: Aug. 30, 2011

(54) METHOD AND SYSTEM FOR REPUTATION EVALUATION OF ONLINE USERS IN A SOCIAL NETWORKING SCHEME

(75) Inventors: James Duncan Work, Mountain View, CA (US); Allen Blue, Sunnyvale, CA (US); Reid Hoffman, Mountain View, CA (US)

(73) Assignee: Linkedin Corporation, Mountain View, CA (US)

( * ) Notice: Subject to any disclaimer, the term of this patent is extended or adjusted under 35 U.S.C. 154(b) by 1254 days.

(21) Appl. No.: 11/219,035

(22) Filed: Sep. 1, 2005

(65) Prior Publication Data

US 2006/0042483 A1    Mar. 2, 2006

Related U.S. Application Data

(60) Provisional application No. 60/607,040, filed on Sep. 2, 2004, provisional application No. 60/625,287, filed on Nov. 4, 2004.

(51) Int. Cl.
*G06Q 99/00* (2006.01)
(52) U.S. Cl. ...................................................... 705/319

(58) Field of Classification Search ............... 705/1, 319
See application file for complete search history.

(56) References Cited

U.S. PATENT DOCUMENTS

| 5,659,731 | A   | * | 8/1997  | Gustafson ........................ 707/4   |
| 2004/0122803 | A1 | * | 6/2004  | Dom et al. ....................... 707/3   |
| 2004/0148275 | A1 | * | 7/2004  | Achlioptas ....................... 707/3   |
| 2004/0167794 | A1 | * | 8/2004  | Shostack et al. .................. 705/1   |
| 2004/0215502 | A1 | * | 10/2004 | Takahashi et al. ............... 705/10  |
| 2005/0159970 | A1 | * | 7/2005  | Buyukkokten et al. ........... 705/1   |
| 2005/0159998 | A1 | * | 7/2005  | Buyukkokten et al. ......... 705/11  |
| 2006/0009994 | A1 | * | 1/2006  | Hogg et al. ...................... 705/1   |

* cited by examiner

*Primary Examiner* — Jami A Plucinski
*Assistant Examiner* — Shaun Sensenig
(74) *Attorney, Agent, or Firm* — SNR Denton US LLP

(57) ABSTRACT

A method and system for evaluating the reputation of a member of a social networking system is disclosed. Consistent with an embodiment of the invention, one or more attributes associated with a social networking profile of a member of a social network are analyzed. Based on the analysis, a ranking, rating or score is assigned to a particular category of reputation. When requested, the ranking, rating or score is displayed to a user of the social network.

3 Claims, 5 Drawing Sheets

REPUTATION INDICATORS FOR JANE SMITH 70

Connections and Networks
157 connections; network analysis: 60
High Seniority   High Influence   High Diversity

Endorsements and Endorsers
Endorsements: 11   network analysis: 80
Endorsers close to you
Endorsements related to your search

Verifications
Third-party verified resume
Group memberships
Professional certifications and awards
Publications
Other verifications

Take Action
Contact:   Jane   Endorsers
Find Likely References

Social Networking Activity
High Influence
High Responsiveness
Profile completion: 100%
Member in Good Standing

Access to Jane and Jane's References
High Access
You are 2 degrees from Jane, connected through 3 of your contacts
You are 2 degrees from 1 Endorser.
You know 5 people who have worked in Jane's organizations.
What you and Jane have in common 72

FIG. 5

METHOD AND SYSTEM FOR REPUTATION EVALUATION OF ONLINE USERS IN A SOCIAL NETWORKING SCHEME

RELATED APPLICATIONS

This application is related to and hereby claims the benefit of the filing dates of U.S. provisional patent application Ser. No. 60/607,040, filed Sep. 2, 2004, and U.S. provisional patent application Ser. No. 60/625,287, filed Nov. 4, 2004, both of which are incorporated herein by reference.

FIELD OF THE INVENTION

The present invention relates generally to systems and methods for reputation evaluation of online users in a social networking scheme.

BACKGROUND

Oftentimes the most relied on sources of information concerning the reputation of a person, organization or service are the recommendations of friends, family, neighbors and/or colleagues. For example if one needed to find a local dentist, he/she might ask friends and neighbors in the area who their dentist is or if they had any suggestions. Referrals provided via these trusted sources would tend to be highly regarded, though not necessarily because they are correct, but rather because they come from people the inquirer knows and trusts. Likewise, when a vice president of a company is seeking a new marketing manager, she may ask colleagues, employees and friends if they can recommend someone who has the right qualifications for the position. Again any recommendations from these sources may tend to be more highly regarded than, say referrals from professional recruiters, because the vice president knows and trusts the sources of the referrals. Indeed, the inquirer could gage her level of trust depending on how well she knows the person making the referral. In some ways, the subject of the referral becomes imbibed with the same attributes as the person making the referral, at least in the mind of the inquirer. Of course, the referral may not come from the inquirer's immediate contacts but instead from contacts of those contacts. For example if the vice president's immediate contacts do not know anyone with the qualifications she is looking for, these contacts could then consult their trusted contacts for someone who may be a fit. This process could continue for several iterations involving multiple degrees of connections until ultimately a candidate is found for the marketing manager position. This network of friends and other known and trusted individuals, and their friends and contacts, is a social network.

More generally, social networks may be regarded as networks of people connected by trust, shared values, and/or a mutual need for cooperation. Social communities, cooperative business relationships, and professional associations are all examples of social networks. Social networking systems create social networks to find business partners, clients and people with shared interests and values. Such systems are also used to share knowledge, build and strengthen communities, build teams, and map and analyze complex organizational networks.

This concept has expanded to online communities where people share and use these contacts to find new friends, romantic interests, and business partners or employees. This provides an easier and more organized way to manage and develop one's social network. A person may receive an invitation from a friend or colleague to join an online community or decide to join independently. To join a user must set up an account which may include an account name and password and the user may be required to set up a personal profile which lists activities and interests and/or resume details such as past positions and experiences. The user can then add contacts to his or her network, those contacts can add their contacts and so forth and so an entire online social network is created. A user can then use his/her network to search for a new friend, romantic interest, business partner or employee. Most online social networks show the links for each potential target listed in a search so the user knows how far removed the target is. The target may be a first-degree contact meaning he/she is within the user's immediate friends and contacts, or he/she may be a second, third or further removed contact.

In addition, many of these online communities have some sort of reputation system where a user can either write a testimonial about a person in their network or rate that individual based on several characteristics. The purpose of a reputation system is to build confidence and trust in and between users in the online community. Reputation systems store reference information plus evaluations and endorsements in electronic databases to be associated with users' profiles and resumes. Searchers use these stored references and endorsements to enhance their ability to find others who not only appear to match their requirements, but who have also received positive endorsements.

Many existing reputation systems in online communities suffer from the drawback that most people do not truly know one another, other than in the context of the online community. That is, the users have limited prior experience with and personal knowledge of other people in their community. For example, many online retail stores have reputation systems which permit customers to comment on a particular product they have purchased and/or rate the service or product based on some predetermined criteria. This data is then aggregated and a score is displayed (sometimes along with individuals' comments) next to a particular product. The data so collected, aggregated and ultimately displayed is based on transactions that occur only in the online community environment and there is no personal connection or network between the customers beyond interest in the same product or service. Thus to develop a reputation system, such online communities depend on ratings of content, immediate online behavior and results of online transactions, which are then aggregated into a statistically objective collective reputation.

Online social networking systems create additional, unique opportunities for a reputation system that is much more robust and accessible. Existing systems allow members of the community to write a testimonial or endorsement of certain people in their network of contacts. For example a user, Jane, may know that one of her contacts, Bob, is looking for a job. Since Jane has previously worked with Bob and knows him to be an excellent market research analyst as well as a hard worker and easy to get along with, she might write an endorsement about Bob that would be included as part of Bob's online profile. When a potential employer is searching the online network and comes across Bob's online profile the employer can immediately see the reference in Bob's profile.

The problem for the potential employer then becomes how to ensure such an endorsement is valid, complete, and accurate. More generally, uses of online social networks need mechanisms to build confidence in their system. The online community usually provides the "degree of connection" so the searcher can see how far removed the target and the endorser(s) are from her primary contacts. Typically, however, as these associations get more and more remote, the searcher's confidence level wanes. The endorsement may be written by someone unknown to the searcher such as a friend, of a friend, of a friend. How does the searcher know that this "friend" writing the endorsement is a trusted source and so the target is indeed a qualified individual? With many online communities now attracting hundreds of thousands of users, a typical search may return large lists of potential targets that are quite far removed from the searcher's most trusted and reliable contacts and so this problem is rapidly becoming one of significant importance.

It is also true that people have a tendency to write only positive endorsements, so it is not clear if one is getting accurate and complete information from the references. Some social networks provide a verification report that is created through an automated process of reference checking by sending emails to sources to verify certain information on a particular person. However this may only be helpful for verifiable information such as resume details like employers, clients, schools, test scores, degrees, certifications, published reviews and articles, and organization membership. The question of how to get more information about a person (such as the person's work ethic and style) when trying to fill a particular employment position, how to contact references who can speak about a person, or how to obtain more information on references provided by the person is left unresolved.

It is important to create a community where users have confidence that the reputation system provides accurate and valid information. Presently available reputation systems for online social network communities are inadequate to provide the appropriate level of confidence and validity and to allow further communication with an endorser of a person. The present invention addresses these inadequacies.

BRIEF DESCRIPTION OF THE DRAWINGS

The present invention is illustrated by way of example, and not limitation, in the figures of the accompanying drawings in which like reference numerals refer to similar elements and in which:

FIG. 5 illustrates an example user interface showing detailed information about various reputation indicators for a particular user according to one embodiment of the present invention.

DETAILED DESCRIPTION

Figure 1:
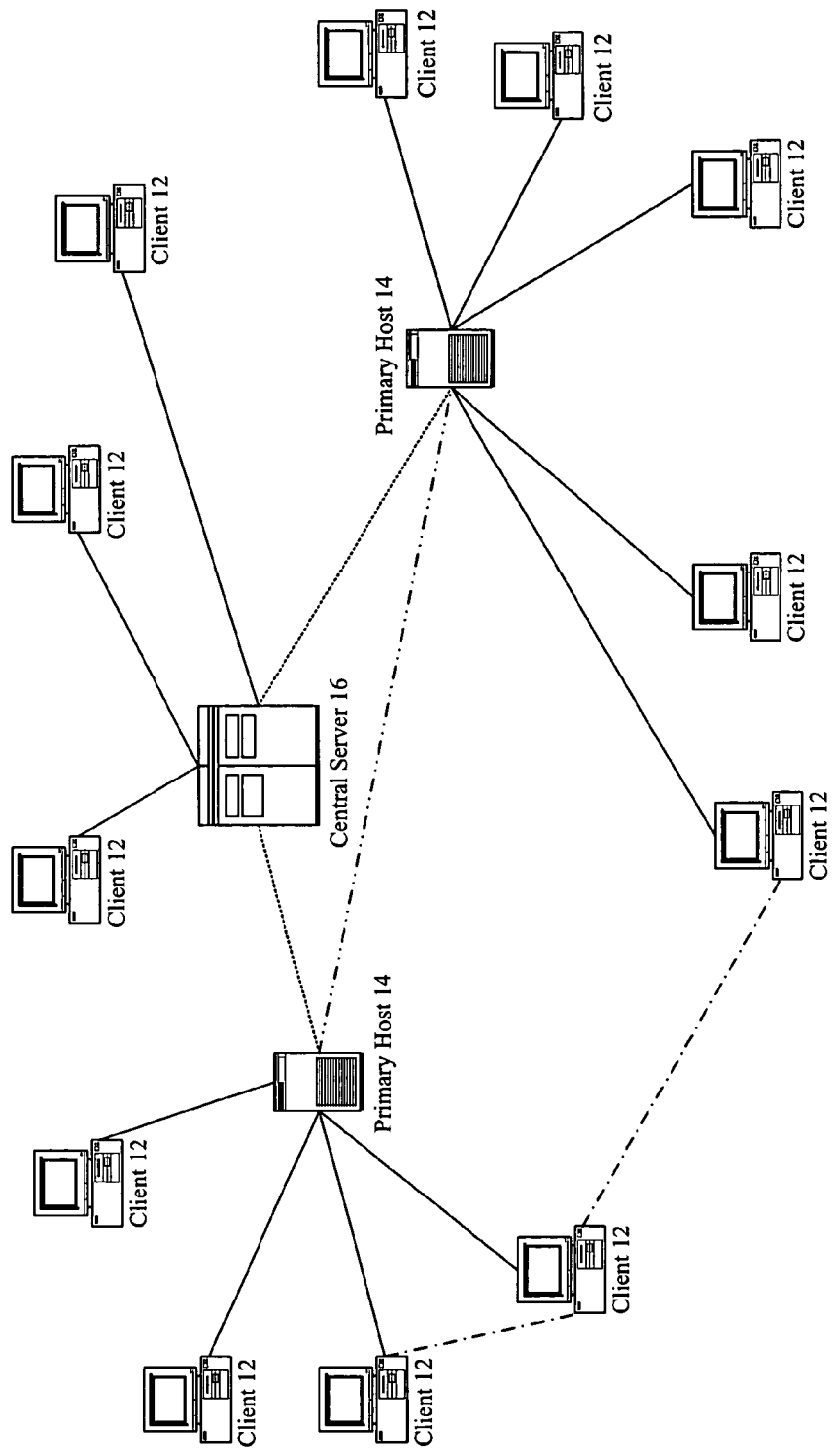
FIG. 1 illustrates a network environment, consistent with an embodiment of the invention, including clients and servers.

Methods and systems for reputation evaluation of online users in a social networking scheme are described herein. Although discussed with reference to certain illustrated embodiments, upon review of this specification, those of ordinary skill in the art will recognize that the present scheme may find application in a variety of systems. Therefore, in the following description the illustrated embodiments should be regarded as exemplary only and should not be deemed limiting in scope.

In the following description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical, and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented by an apparatus for performing the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform the required method. For example, any of the methods according to the present invention can be implemented in hard-wired circuitry, by programming a general-purpose processor or by any combination of hardware and software. One of skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

One embodiment of the present invention may be implemented as computer software incorporated as part of an online social networking system. The system operates with a computer system using a Windows, Macintosh, UNIX, Linux or other operating system equipped with a Web browser application, or other Web-enabled device capable of connecting to the Internet or other network system. It should be noted that the term "Internet" is intended to encompass similar systems and nomenclature (i.e., World Wide Web or "www") comprising the capability to communicate and access information through a network, telephone connections, ISDN connections, DSL connections, cable modem, fiber optic network, etc. The present invention should not be limited in its communication nomenclature; the present invention is applicable to any system that is accessible by means of a Web browser, or other means of communicatively coupling one device or server to another.

System Operation and Architecture

To better understand this system, consider first the illustration shown in FIG. 1. In FIG. 1, a network 10 includes a number of clients 12 and servers. The servers may be divided among primary hosts 14 and central servers 16. Primary hosts 14 may serve a number of local clients 12 while central servers 16 may interconnect a number of primary hosts 14 and/or serve various remote clients 12. Although only a limited number of clients 12, primary hosts 14 and central servers 16 are shown in this diagram, it should be understood that any number or configuration of these computer-based components may be used in various embodiments of the present invention. Further, some or all of these components may exist on mobile platforms, such as handheld computer systems and the like, and in peer-to-peer platforms. The network 10 may be a portion of a much larger computer network or networks, such as a corporate enterprise network or even the Internet. The clients 12 and various servers 14, 16 may be combinations of hardware and/or software configured in accordance with the teachings presented herein and the use of any specific programming language(s) and/or hardware platform(s) is not critical to the present invention.

From the diagram, it should be clear that various intercommunications amongst network elements might take place. For example, communication between clients 12 and primary hosts 14 are quite common, as are communications between primary hosts 14 and central server 16. So too are communications between various primary hosts 14 contemplated, as are communications between central server 16 and clients 12. Indeed, even peer-to-peer communications between clients 12 are contemplated within various embodiments of the present invention. The types of communication links that support these communication paths are not critical to the present invention and may include both wired and wireless communication links, with appropriate communication protocols. Further, the specific routing protocols that are used to ensure delivery of the messages among these network elements are not critical to the present invention and any appropriate routing protocols (e.g., TCP/IP, AppleTalk, etc.) may be used.

Figure 2:
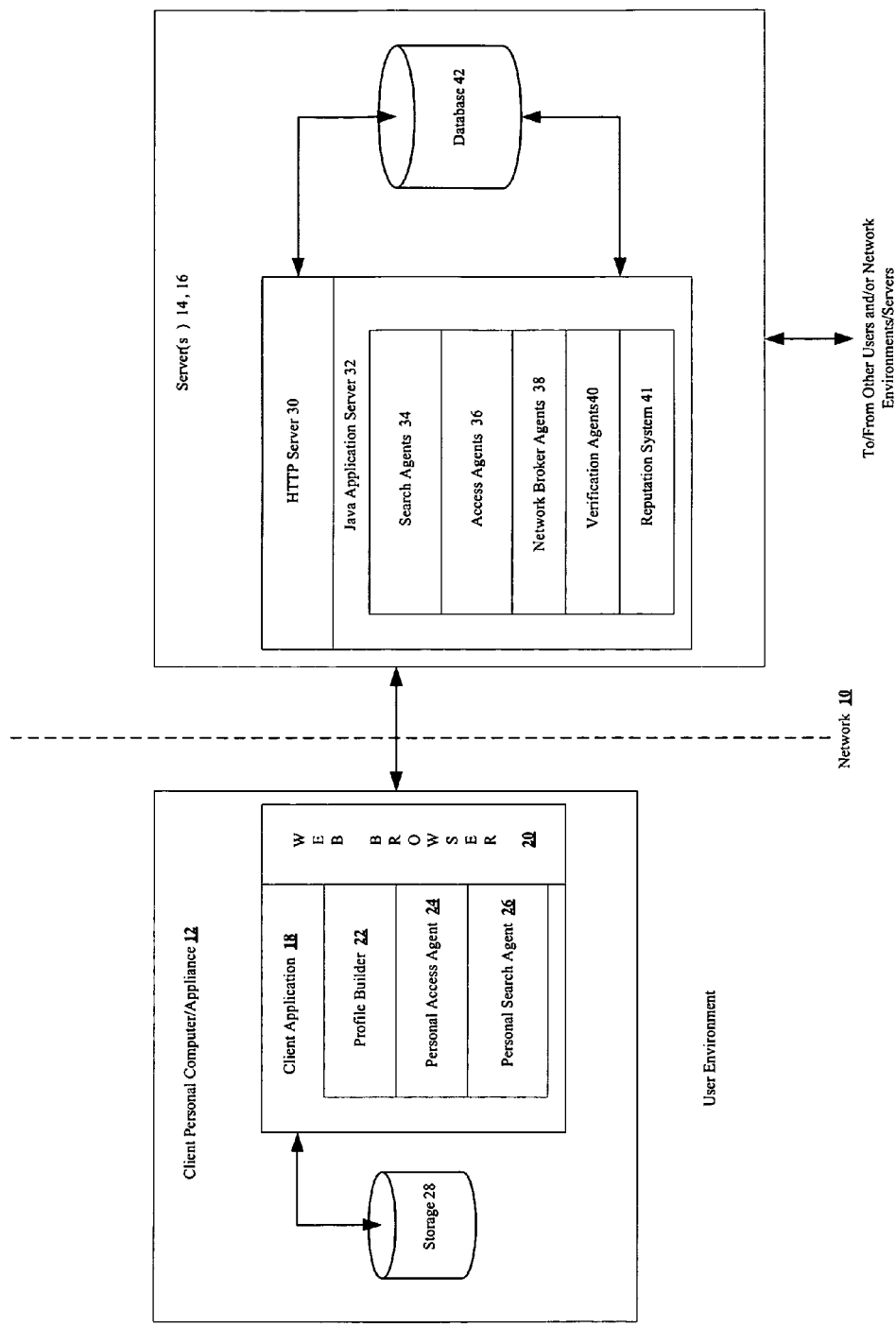
FIG. 2 illustrates one embodiment of a software architecture for supporting methods of the present invention.

FIG. 2 illustrates one embodiment of a software architecture for supporting the methods of the present invention. Such a system is described in U.S. patent application Ser. No. 09/852,336 titled "Method and Apparatus for Internet-Based Human Network Brokering," incorporated herein by reference. As shown in FIG. 2, client 12 includes a client application program 18, which may make use of a conventional Web browser 20, as discussed above. The client application 18 includes a personal profile builder 22, a personal gatekeeper (or "access agent") 24, and a personal search agent 26. The personal building agent 22 guides users in the process of building profiles which are most effective when related to their objectives. The personal access agent 24 allows users to protect the information in their profiles and their attention from inappropriate access, and makes their personal profiles connectable. The personal search agent 26 is a tool that guides a user in constructing a profile for a search target.

The client application 18 may reside in on-board storage 28 (e.g., main memory and/or a hard drive or other long-term or non-volatile storage device), and this storage unit may also be used for temporary storage of variables, etc. in the conventional fashion. The server-side software (which may reside in primary hosts 14 and/or central servers 16) includes a conventional Web server application 30 (e.g., to manage http requests and other conventional Web server functions) and an application server 32 (which, as indicated above, may be based on Java programming technology).

Application server 32 includes various elements, such as search agents 34, access agents 36, network broker agents 38, verification agents 40, and a reputation system 41. The search agents 34 and access agents 36 act similar to the personal search and access agents described above. The network broker 38 is a network agent that emulates the function of a human broker negotiating between users' personal search and access agents. The verification agent 40 is a network agent that by automated process, authenticates and verifies information users have recorded in their profiles. The reputation system 41, discussed in greater detail below, can be integrated in the social networking system as shown in this example or can be implemented as a plug-in as a separate system outside the social networking system.

Servers 14, 16 also include (and/or have access to) one or more databases 42 which communicate with the http server 30 and the application server 32 and provide storage facilities for these applications. The types of information stored in database 42 by the application server 32 may contain a secure, composite data structure that maintains information about all users of the system plus a record of prior searches and matches, which the network broker agent 38 can access to learn and reapply successful search strategies.

Many components of the present system may be embodied as Java applets or applications to maintain the richness of an object-oriented approach while using a conventional web browser and HTML (hypertext mark-up language) and XML (extensible markup language) as the delivery platform for the user interface. For compatibility with Java-based interface agents that might be delivered through the user interface, Java application server 32 should dynamically generate the HTML ("compiled HTML"). There should be a high capacity database on or accessible to the server 14, 16, and more limited "persistent store" capabilities on the client-side 12.

The present invention is not limited to the above-described software architecture. In an alternative embodiment, server 14 may be a Web server having a server-side database, and client-side Web browsers may interact with server 14 using conventional Internet communication protocols. When interacting via a Web browser in this fashion, typically nothing is stored on the client side. All persistent user instructions are instead stored on server 14. In addition, message servers (such as e-mail servers) may facilitate sending invitations, acceptances, and requests and other messages between individuals, and also facilitate sending messages or instructions between the server 14 and clients 12. Embedded links in e-mails can be used to direct users, in context, to a particular page on the website, or activate server-based programs. In addition, software for use on client machines may be downloaded by a user from the Web server 12 and installed on the user's machine. This software can interface with desktop applications (such as Microsoft Outlook and other address books and personal information managers) so that much of the functionality and data storage described above can be incorporated on a user's client machine and without being connected to the Internet.

Social Networking System Operation

To join a social networking system a user may complete a registration page and enter a valid email address as a unique identifier, plus a private password. The user then may set up her profile and enter her contacts. The profile describes the user's background, experience, current and prior interests, capabilities, positions and tiles, skills, values, projects, goals, etc. A similar profile is created describing the user's employing organizations. The user can add contacts to her network by entering contact and relationship information, and profile information for the contact, or a link to the contact's own profile on the system. The contact information may also be automatically uploaded or extracted from other sources such as an electronic address book, and authorized by the user for use in the system. A user may not want her address book integrated in the system. In this case a user's address book would be uploaded, but not integrated into the system and possibly hidden from others. The profile and contact information may be stored in either a central database or in distributed databases 42.

The user can then invite contacts to become mutually confirmed direct contacts. To do so, person A would enter person B's name and email plus an invitation message. A message would be sent to B. If B is not a member of the system, the message to B would additionally include instructions and a link to allow B to join the system. If A's invitation is accepted, both profiles would be updated to show that A and B are mutually confirmed connections.

Once a user joins the online social network, the user can search for people who meet various requirements. For example an employer searching for a potential employee may enter an appropriate search query and launch a search. One or more targets found as part of the search may subsequently be displayed to the searcher. Targets may be users of the system or non-users of the system who are found in address books of users. The connection path between the searcher and the target may also be displayed for each target. A connection path is a chain of connections between the searcher and the target and may extend from one to several degrees of separation. For example, a three-degree connection would be where the searcher knows C1 (Connector 1) who knows C2 who knows the target. The connection path to each target can be displayed in the search results or included as an option a user can select for more information regarding the target.

The search results may include summary information about each target matching the search and targets may be sorted by one or more factors. Some factors may include length of connection path, strength of connections, percent relevance of the match, etc. The searcher may also be provided the option to view a full or a partial profile of any target.

Contact with a target can be requested by any appropriate means. For example, the searcher may be prompted to write a message to the target describing the purpose of the request, plus a message to any intervening connections (e.g., C1) that connect the searcher to a connection chain leading to a target. The message(s) may be sent via e-mail or other communication means either via the connectors or directly to the target according to various preferences of the searcher, connectors and target.

For example, if the searcher has a three-degree connection to the target (searcher→C1→C2→target), the request message may go first to C1, the searcher's direct connection. If C1 approves the request, it is then sent on to C2. If C2 approves the request, it is then sent to the target. If the target or any connections along the chain rejects the request, a message may be sent to the searcher stating the request was denied. Otherwise a message is sent to the searcher that the target accepted the request and the target would then contact the searcher or vice versa.

Reputation System

It is important that reputation systems for online social network communities provide features to create an environment of trust, build confidence in users, ensure accurate and valid information, and allow further communication between references/endorsers and users in general. This invention creates this environment by providing information regarding a searcher's relationship with a reference and providing means to determine the reliability of the reference's opinions about a target. Specifically, the present system provides methods to request and create endorsements, get more information about an endorser, make contact with an endorser, create sealed/hidden endorsements, find and make contact with likely endorsers, and verify and validate endorsers; provides an endorsement interface; and further describes strategies for measuring influence and reputation to create a more accurate and thus more trusted reputation system in a social networking community.

Reputation system 41 (of FIG. 2) stores reference information along with actual evaluations and endorsements in electronic databases 42 to be associated with users' profiles and resumes. These stored references and endorsements may be used so as to enhance the ability of searchers to find targets who not only appear to match their search requirements, but who have also received positive endorsements by others.

Further, using reputation system 41 a user can request endorsements from, and offer endorsements to other users in the system. For example, using appropriate menus or other interface elements (e.g., assuming a user interacts with the social networking system via a Web browser), a user can choose to request an endorsement from another user or write an endorsement for another user in the system. A user writing an endorsement (an endorser) can endorse a particular user's capabilities and qualities in general or endorse a particular element of the endorsee's profile. In some cases, the endorsee may be given the option to accept or decline the endorsement. In such cases, and if the endorsement is accepted, the endorsee's profile will be updated to include the new endorsement. In other cases, endorsee's may not be permitted to accept or decline endorsements, however, in such cases mechanisms (such as independent review or other filtering) may be provided to avoid potentially libelous material from becoming associated with a user's profile.

Assuming a user has one or more endorsements associated with his/her profile, now when that profile is selected (e.g., by a searcher seeking a target of a new search), some or all of the endorsements added by endorsers may be viewable. Each endorsement so viewable may include the endorsement itself (e.g., in the form of a free text message, response to prompts, categorized score (e.g., for one or more criteria), or various combinations of the foregoing). In addition, the endorser's name, a link for viewing more information about the endorser (e.g., the profile of the endorser), information on how to make contact with the endorser, the relationship of the endorser to the target (e.g., the endorser may be a client or supervisor of the target), how long the endorser and target have known each other, and the relationship of the target to the searcher may also be provided.

Using the facilities of the social networking system, the searcher may make contact with the endorser. In some cases, this contact may be made by first contacting the endorsee and having her forward a request for contact directly to the endorser, or it may be based on other conditions specified by the endorser. For example, an endorser may specify that any searcher should always make direct contact with her to discuss the endorsee, or that only those searchers within a certain degree of connection to the endorser should make direct contact.

Thus far, the endorsements that have been discussed are "open endorsements", meaning that the endorsee can view the endorsement (though he/she may not be able to accept/reject it). To increase user confidence in the objectivity and completeness of endorsements, an endorsee may also choose to accept sealed endorsements. Sealed endorsements cannot be rejected by the endorsee nor, in some cases, be viewed by the endorsee. The endorser is fully in control over what appears in the endorsement.

A user may choose to accept such sealed endorsements by, say, setting an option in his/her profile or preferences (e.g., an accept "sealed endorsements" data field set to TRUE). This setting may then be used to display a special symbol that alerts searchers viewing the user's profile that he/she accepts sealed endorsements, and/or act as an additional weight when computing endorsement reliability scores.

A special case of sealed endorsements involves endorsers that wish to restrict viewing of an endorsement to only selected users (typically, not including the endorsee). This can be done by setting restrictive limits on who can access the endorsement (e.g., limiting viewing thereof to only first degree connections of the endorser). To create this hidden endorsement a special endorsements page would be displayed that only the endorser can view and edit. This page may be associated with a contact record in the endorser's address book. The endorser can either write an endorsement to be "hidden" or she can simply indicate that she is knowledgeable about the target contact and is willing to talk to certain people who may be interested. The endorser would then set appropriate access control parameters to determine who can view the endorsement. Based on the criteria set by the endorser, the sealed endorsements or endorser contact information would be displayed or kept hidden.

To provide for comparative scoring capabilities (e.g., to allow readers some common ground with which to evaluate endorsements), a form of questionnaire may be provided to a prospective endorser, to be completed when she is creating an endorsement. The questionnaire may contain questions to help further clarify the nature and degree of the endorsement such as rating the strength of the endorsement on a numerical scale and similar ratings for particular attributes such as competence, skills, ability to work with others, management capabilities, etc. The questionnaire may restrict the endorser to using only pre-defined responses, such as rankings or other numerical responses in addition or in the alternative to the written endorsement. The pre-set responses can then be counted and/or aggregated with other endorsements to provide an aggregate endorsement score. A threshold number of hidden endorsements may be required before reporting an aggregate score that includes scores form the hidden endorsements to prevent a user from deducing which endorser may have given the endorsee a neutral or negative score. To expose a negative distortion intended to harm the endorsee, a flag can be set or a score questioned that is significantly out of line with others, especially if out of line with the aggregate score of all the other endorsements. An endorser could also have the option of choosing "No rating" in response to certain questions if the endorser does not have enough information to rate the user on a particular attribute or if the endorser does not want to say what she really thinks. This data may also be displayed to a searcher along with the above-mentioned endorsement information.

In addition to any endorsers included in the target's profile, a searcher may want to find other individuals to provide information about the target. This may be done using the facilities of the social networking system to locate contacts of the target or other likely endorsers. For example, searches for people who list the target as a direct connection, list the target in their address book, work or have worked in any of the organizations described in the target's profile during the same time that the target worked there, and/or are connection of connections to the target may all be performed. Any search results may be returned in ranked order according to any desired criteria.

For example, to sort the results so that the best results appear at the top, the first order of search may be by degrees of connection between the searcher and the likely endorser. Within the results for each degree of separation, the following sort order may be used:
1. People who list the target as a direct connection AND worked in any of the listed organizations at the same time as the target.
2. People who list the target in their address book AND worked in any of the listed organizations at the same time as the target.
3. People who list the target either as a direct connection OR in their address book AND who worked in any of the listed organizations within the last five years.
4. People who worked in any of the listed organizations in the last five years.
5. People who have listed people in their address book who now work in any of the listed organizations.

These results may be displayed to the searcher, who can then seek more information about the likely endorsers and make contact using any of the above-described means.

Several other methods may be used to verify or measure a target's reputation, which methods may also be used to verify or measure the reputations of endorsers of a target. Some of these methods involve reporting objective information that can be readily validated by an external trusted third party, including: academic degrees, test scores and certifications, honors, awards, published reviews and articles, memberships in organizations with verifiable membership and verification of resume details by employers, clients, schools, certification bodies, and background-checking agencies.

Other methods to verify or measure a target or endorser's reputation involve the use of social network analysis. One such method involves an analysis to measure what is referred to as the Network Measure of Influence. This measure is based on the proposition that people who are influential tend to have influential networks, and vice versa. These measures of collective influence of a user's networks may thus be good indicators of the user's influence and can also be used to measure the influence of other users who endorse the user. Two scores may be calculated: a collective influence of the user's endorsers, and a collective influence of the user's mutually-confirmed connections. Each of these scores may be based recursively on similar scores for each of the endorsers or mutual connections that make up the collective score. That is, they will take into account influence of people several degrees deeper than the profiled user's direct contacts. Influence scores may make use of known algorithms for measuring status, prestige, and influence within a social network, plus additional algorithms derived from analysis of user data from the social network system (see, e.g., the computations described below). Scores may include weighting to adjust for various factors, including: level of seniority (e.g., derived from current and recent titles, organization size and other measures of organizational prestige, and length of time spent in recent levels of seniority); independence (including role and cluster independence); relationships to a searcher (including roles, and degrees and strengths of connections); and endorsements and influence of endorsers. As above, each of these scores may be based recursively on similar scores for each of the endorsers or mutual connections that make up the collective score. Minimum criteria for displaying each score may include: having a minimum level of information required to derive a statistically valid score, having a minimum level of information required to protect user anonymity, and a profiled user's preference for showing or not showing the score.

Another method may involve measuring what is referred to as a person's Network Authentication Score. This score authenticates (to some degree) that the user is a real person and that the profiled user's mutual connections consist of similarly authenticated people. This score is derived by comparing analyses of the user's network to authentication standards derived from the entire network. Authentication standards are derived from assessments of the probability that a user's network could contain fraudulent nodes (people).

In another embodiment, yet another method may involve measuring what is referred to as a measure of Network Independence. Analysis of a person's network, and especially analysis of the networks of a person's endorsers can be used to reveal a degree of potential bias or lack of bias. For example, if a majority of a user's endorsers tend to know each other and especially if they also tend to endorse each other, then the potential for bias would be greater than if a user has a number of endorsers in unconnected isolates or groups, and if the profiled user does not reciprocally endorse a large percent of those who endorse him/her.

Furthermore, methods of analysis may measure what is referred to as Network Diversity Profiles and Metrics. A score for network diversity is not directly related to reputation; however, it may be included as a tool to evaluate a profiled user based on analysis of the user's network. Measures of network diversity may also be used as a component for authenticating a person's networks. This proposition assumes that highly diverse networks are harder to forge (and thus more likely to be real) than less diverse networks given a norm for an entire network. A single metric of network diversity may thus be computed for each profiled user and comparisons of a profiled user's network diversity to an appropriate norm derived from the entire network may be presented. An example of an algorithm for deriving normative diversity metrics is as follows:
  For each user in the network, construct a network diversity profile by first counting the number of and percentage of contacts in a particular category of network diversity. Categories may include particular industries, professions, locations, interests and skills groups, and other relevant demographics.
  Parse the total counts for each category into counts for each degree of relationship to the profiled user. That is, what number and percentage of contacts in each category are in the user's direct contacts, 2nd degree contacts, etc.
  Uncover clusters of users with similar network diversity profiles using statistical modeling techniques.
  Use similar techniques to construct normative network diversity profiles for various combinations of industry, profession, and location, and to also construct a normative network diversity profile for the entire network.
  The network diversity profile for a particular individual will then be compared to appropriate normative diversity profiles and given a score based on the results of that comparison.

Still other methods involve use of objective measures derived from the target's activity within the social networking system include measures that give indications of the target's popularity and influence among other members of the social network. For example, people who are frequently invited to connect by others are typically considered to have high influence, especially if invited to connect by others who have high influence. Likewise, people whose invitations are more frequently accepted by others are considered to have high influence, again especially if those accepting also have high influence. In one embodiment, these measures may include:

Total requests for contact received by the target and percentage of those requests accepted by the target.

Total requests sent by the target and percentage of those requests that are accepted by the recipients.

Total requests to forward requests for contact received by target and the percentage of those requests that the target forwards.

Total requests forwarded by the user, and the percentage that are forwarded by the next person in chain.

The number of invitations received by the target and the percentage accepted.

The number of invitations sent by the target and the percentage accepted by the recipient.

Further, these measures can be used to more accurately measure a reputation of a user by giving higher weight to endorsements from people with high influence. Some assumptions for measuring influence are:

People with a large number of mutually confirmed connections tend to be influential and well connected.

People who receive large numbers of invitations tend to be more influential than people who receive few invitations.

People who receive more invitations than they send tend to be more influential than people who send more invitations than they receive.

People whose total invitations received and accepted are larger than the number of invitations sent and accepted tend to be more influential. (By not counting invitations that are not accepted by either party, this metric removes variances in invitation acceptance rates that are not related to levels of influence and popularity, for example influential people who automatically invite their entire contact list without filtering it for relationship strength.)

People with larger number of invitations accepted are more popular than those with lower numbers.

People whose invitation acceptance rate is closer to 1 (determined by a ratio of total invitations sent by target and accepted by recipients/total invitations sent by target (ISA/IS)) tend to be more influential than people with a smaller acceptance rate.

There are several likely exceptions to the basic assumptions listed above. These include:

People who are not active in the social network will have very few connections in the system. This has no reliable relation to their connectedness and influence in the "real world".

Social networking "evangelists" may send as many or more invitations as they receive. They can be detected because they have both a high number of contacts and high acceptance rates.

Members who automatically invite their entire address book may have a high number of connections but will have lower than average acceptance rates and low average strength of connections. When members accept the invitations of people they do not know well, acceptance rates go up. However, this kind of acceptance is not a good measure of influence in the "real world". When strength of connections is not readily measurable in the on-line community, this can be very hard to detect.

Highly influential and popular people who automatically invite their entire address books will have low acceptance rates, and low average strength of connections, but will also have a large number of strong connections. Thus their invitation acceptance rates will be higher than the majority of "invitation spammers" who are not influential.

Invitations sent to people who are currently not members of the social networking system will usually have lower acceptance rates than invitations sent to people who are already members, thus this factor must also be taken into account.

Using these assumptions and exceptions, various means can be used to derive measures of influence from a user's social networking activity. In one embodiment, people with "high" influence may be determined using (i) a ratio of total invitations received and accepted by target to total invitations sent by target and accepted by recipients (IRA/ISA), and (ii) a ratio of ISA/total invitation sent by target (ISA/IS). Where both of these measures are in some specified upper percentile (e.g., 20%) of the total user population, the associated user will be deemed to have high influence within the community. People with still higher scores (e.g., the top 20% of top 20%) will be considered to have "very high" influence. People who qualify as having "very high" influence based on only one of the two scores and who do not qualify at all based on the other score, will be considered to have "high" influence. These scores may be further refined by recursively examining the subject users to determine whether or not they maintain a minimum number of connections with other influential people.

To adjust for the first exception discussed above (i.e., users that are not particularly active in the on-line community), scores may not be calculated or reported for users with a number of mutual connections that is below a minimum threshold (e.g., 50 connections). Likewise, scores may only be reported for users with either "High" or "Very High" influence. Users will be alerted that while a high influence score is a good indication of influence, absence of an influence score does NOT indicate lack of influence.

To adjust for the second exception, influential social networking evangelists will be identified by looking for users with a minimum threshold of invitations sent (e.g., 100) plus a minimum threshold of invitations sent that are accepted by recipients (e.g., 60%) AND/OR a minimum threshold of invitations received and a minimum value for the ratio of IRA/ISA (e.g., 0.8). Any person with this indication may be measured for influence based solely on ISA/IS.

To adjust for the third and forth exceptions, people who send very large numbers of invitations ("big inviters") will be identified as users who exceed a threshold for invitations sent (e.g., 300). These people may be measured for influence based on a lower minimum ISA/IS score than people who invite fewer than the big inviter threshold. They will be considered to be influential if their invitation acceptance rate is in a significantly high percentile for other "big inviters".

To adjust for the fifth exception, invitations accepted by people who are not currently members of the social networking system will be weighted more highly than invitations sent to those who are already members. For example, such weighting may be based on a comparison of average acceptance rates for all invitations sent through the system to members vs. to non-members.

As will be described in greater detail below, these measures can be further refined in several ways. One example is collecting data on various measures related to invitation acceptance, such as total mutual connections, IS, ISA, total invitations received, IRA, date registered, date of first invitation, average invitations batch size, title, company size, country, state, and industry. Another is to include a large sample of invitation spammers and add a new variable to indicate whether a member is an invitation spammer. Spammers can be identified based on measures such as very large numbers of invitations sent, low acceptance rates, little evidence of influence based on title, company size, and name recognition. A better test is to use strength of connections to identify spammers by looking for a large percentage of invitations sent to people with low connection strength. This test will also allow adjustment of abnormally low or high scores of invitation spammers, and others, by discounting invitations sent to people with little or no relationship strength. To do this, a large sample of members who have uploaded analysis of email transactions and contact lists may be used. Then a minimum test of closeness of the relationship based on frequency and reciprocity of emails to a specific contact may be made. Measures of strength of relationship to invitation acceptance rates given various total number of invitations sent may then be correlated and used to more precisely adjust the scores. Invitations sent to people that the sender does not know well may and perhaps should be ignored. Another possible indicator of weak connections is acceptance of a high percent of invitations received by people who send a high number of invitations.

A further refinement of the above technique is to include another large sample of people who are categorized based on apparent degree of influence, for example: very high, high, moderate, and low. Heuristics may be used based on name recognition, title and organization size to categorize people into these different groups.

Still another refinement involves the use of muti-variant analysis to determine correlations between the level of influence and indications of invitation spamming to various factors and test measures of influence, and/or derive best measures of influence. Similarly, measures of influence can be determined by request and forwarding activity. Assumptions here are that people are more influential if their requests are forwarded by their first degree contacts, their requests reach the target, their requests are accepted by the target, requests they forward are forwarded by their contacts, requests that they forward reach the target, requests that they forward are accepted by the target, and the percentage of times a user is chosen to forward a request when the user is one of several of the sender's direct contacts that the sender can choose to ask to forward the request.

An endorsement interface may be used to display some or all of the various measures described above. Various views of the information may be so provided; among them a short summary form, which may include the number of endorsements, the number of sealed endorsements, the aggregate endorsement score, and the aggregate influence score. An option may be provided to allow a user to obtain further detail regarding some or all of these metrics, which detail can include some or all of the data and measures described above (such as reputation indicators related to a target's networks and/or reputation indicators related to a target's social networking activity). For example, a list with a comparison of all endorsers for a target may be displayed. This can include the strength of the endorsement, the relationship of the endorser to the target, the relationship of the endorser to the searcher, an apparent reliability score, a quick link to the endorsement, a quick contact link, an indication of whether or not there is a role or relationship between the endorser and the target that is related to the searcher's purpose, the degrees of connection between the endorser and the searcher, an indication of whether or not there is an apparent independence of the endorser from the endorsed, apparent independence of the endorser from other endorsers, and the endorsement reputation score for the endorser. The user may be permitted to customize these views to remove items she is not interested in.

Information about the endorser can also be customized to the searcher. The concept of "reputation" is often understood to be relative to the person who is interested in the reputation (i.e., here the searcher). For this reason an interface may be included that presents information about endorsers and endorsements that are especially relevant to the searcher. In one embodiment, the reputation system 41 may compare the relationship of the endorser to the endorsee to the relationship most likely intended between the searcher and endorsee and highlight or present those endorsers where the match is most relevant. In addition (or as an alternative), the reputation system 41 may highlight endorsers that are especially close to the searcher based on degrees and/or strength of connections, and/or other affinities (e.g., having membership in the same trusted group).

In some or all of the above-described embodiments, aggregate, rather than raw, endorsement or reputation scores may be used/provided. Many forms of such aggregation are possible, among them:

An average of all endorsements,

An average of sealed endorsements (which may be reported if a sufficient number of sealed endorsements exist), An aggregate weighted score for independence (e.g., including role and cluster independence), An aggregate weighted score for relationships to the searcher (e.g., including role and degrees/strengths of connections), and An aggregate weighted score for endorsements of endorsers.

Reputation Indicators in a Social Networking Scheme

According to one embodiment of the invention, various reputation indicators are generated to reflect different categories and levels of reputation for an individual user of the social networking community. For example, according to one embodiment of the invention, a reputation indicator may include a graphic image, or icon, to communicate a type, or category, of reputation. In addition, the graphic image representing the particular category of reputation may vary to indicate the overall level, or measure, of reputation for a particular user with respect to that particular category of reputation.

In one embodiment, for each user of the social networking community, an underlying aggregate score is computed for each reputation category. A user's aggregate score for a particular category of reputation is then used to determine what variation of a particular reputation indicator should be displayed for that user. For example, a user's aggregate score for a particular category of reputation may be compared to a range of scores. Depending upon the range in which the user's aggregate score falls, a particular reputation indicator will be displayed to indicate the reputation category, as well as the range in which the user's aggregate score falls. Accordingly, in one embodiment of the invention, a user may search to find other members of the social networking community having an aggregate score for a particular category of reputation that is within the same range as the user's aggregate score.

In one embodiment of the invention, for one or more categories of reputation, a threshold value is established. Accordingly, the threshold value may be utilized to determine whether a particular reputation indicator for a particular reputation category should be displayed. For example, in one embodiment of the invention, if a user's aggregate score for a particular category of reputation does not exceed the threshold value, then no reputation indicator for that particular category of reputation is displayed.

In one embodiment of the invention, additional information may be displayed along with a particular reputation indicator. For example, when an aggregate score for a particular category of reputation is useful in communicating a precise measure, then the aggregate score, indicated by a number, may be included with the display of the reputation indicator. Furthermore, additional information for a particular reputation indicator may be communicated via one or more associated links displayed with the reputation indicator. For example, an interactive link (e.g., a hypertext link, or hyperlink) may be displayed along with a reputation indicator. Alternatively, in one embodiment, the graphic or icon that is the reputation indicator may itself be a hyperlink. In either case, when selected, the hyperlink may lead to the display of additional information, such as details regarding the meaning of the reputation indicator, or what factors (e.g., metrics) are used to calculate the aggregate score for the reputation indicator.

Figure 3:
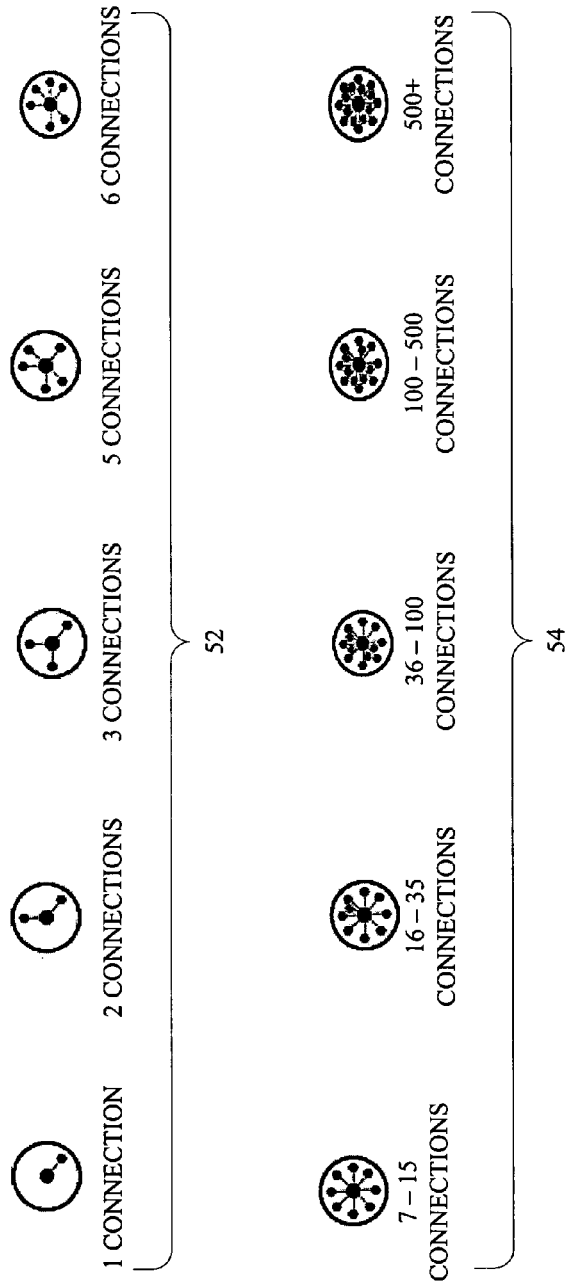
FIG. 3 illustrates an example of various reputation indicators for a category of reputation measuring the number of direct member connections a particular user has established in a social networking community.

FIG. 3 illustrates an example of various reputation indicators 50 for a category of reputation measuring the number of direct member connections a particular user has established in a social networking community. For example, in one embodiment of the invention, a category of reputation may be based on the number of member connections an individual user of the community has established with other members. A direct connection may be established in one of a variety of ways. For example, a member of the social networking community may send an email inviting a friend to register with the social networking community. By accepting the invitation and registering with the online social networking community, the member's friend establishes a direct between the two. Accordingly, a reputation indicator for member connections will reflect that the user has a direct connection with the friend.

As illustrated in FIG. 3, in one embodiment of the invention, the reputation indicators for member connections appear as circular icons. In each circle, a central dot is shown with one or more spokes connecting the central dot to a smaller dot. Accordingly, each smaller dot may represent a member to which the user has established a direct connection. Moreover, in one embodiment of the invention, when an icon for member connections is displayed, it is displayed along with the label (e.g., "1 CONNECTION") shown in FIG. 3. Alternatively, in one embodiment, the icon representing the reputation indicator for member connections is displayed without a label. In one embodiment, the icon may be a hyperlink directed to an Internet document (e.g., web page), including further information about that particular user's direct connections, including the user's actual aggregate score (e.g., number of connections) for the reputation category for member connections.

In one embodiment of the invention, the reputation indicator for member connections indicates an exact number of direct connections that a particular member has established. For example, in FIG. 3, the reputation indicators with reference number 52 are pictorially accurate in the sense that each spoke represents a direct member connection. Accordingly, for a particular user with an aggregate score of five for the reputation category for member connections, the corresponding reputation indicator will display five spokes.

Alternatively, the reputation indicator may indicate a range. For example, in FIG. 3, the reputation indicators with reference number 54 may be utilized to indicate a range in which a user's aggregate score for member connections falls. For example, if a user has established twelve direct connections with other members of the social networking community, the first icon with the label "7-15 CONNECTIONS" may be displayed to communicate that the user has established a number of connections within that particular range. The icon 54 labeled with "500+ CONNECTIONS" may be displayed when a particular user's aggregate score for member connections exceeds a threshold value of five hundred.

It will be appreciated that the particular icons illustrated in FIG. 3 have been provided as examples and are in no way meant to limit the present invention. In different embodiments of the invention, a wide variety of graphics, symbols, text, and/or icons having one or more of the qualities and/or characteristics described herein may be used as reputation indicators for the reputation category for member connections.

In one embodiment of the invention, reputation indicators are used to communicate various qualities or attributes associated with a particular member of the social networking community. For example, as described above, a reputation indicator for member connections may be used to communicate the number of direct connections a member of the community has established with other members of the community. Accordingly, a member of the social networking community may perform a search, based on one or more reputation indicators, to identify other members with particular qualities or attributes. In this context, and for purposes of describing aspects of the invention, a user searching may be referred to as a viewer, and the person being sought may be referred to as a target. For example, a viewer may perform a search to identify all targets within the social networking community with over five hundred direct member connections.

Reputation Indicators in Search Results

Figure 4:
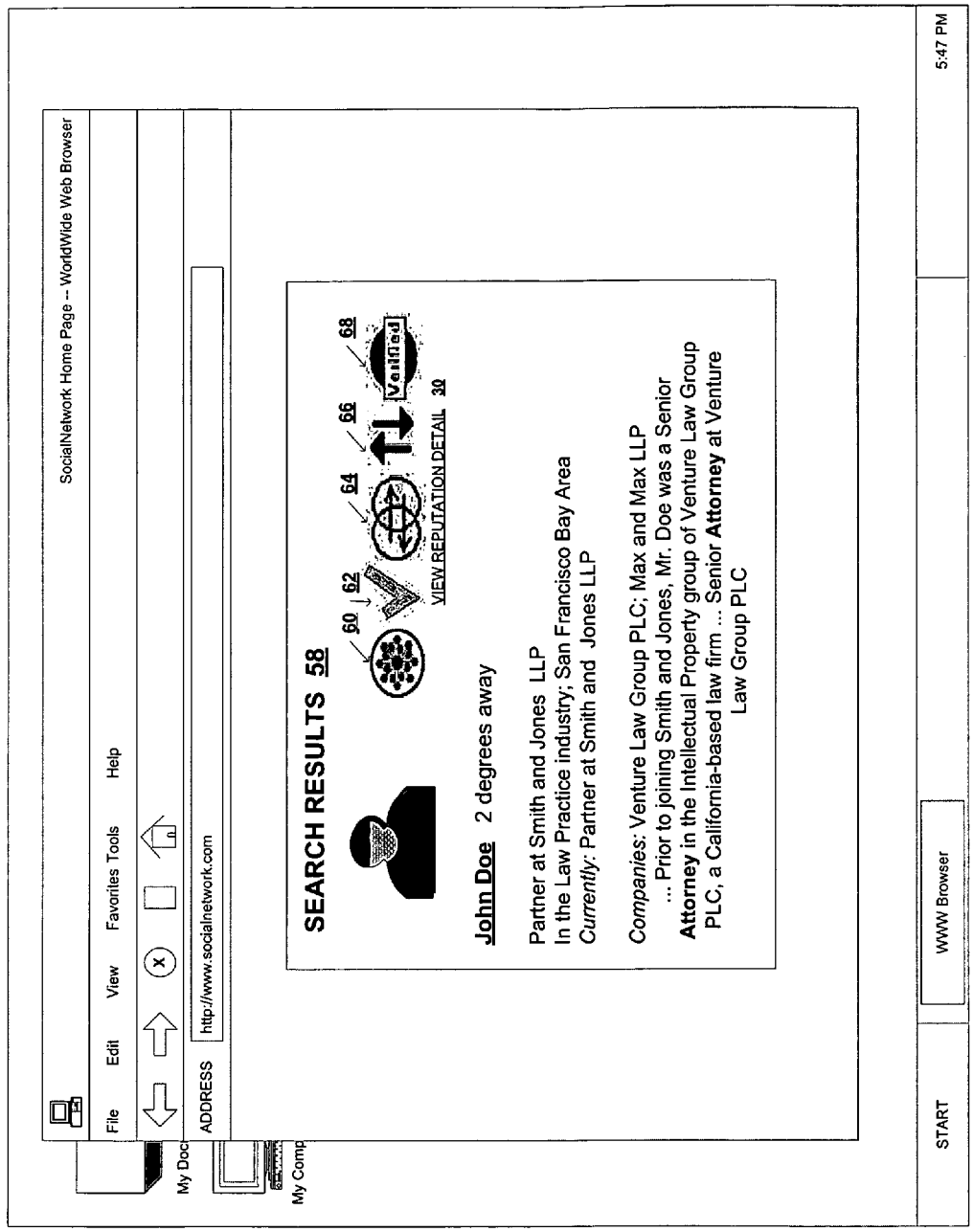
FIG. 4 illustrates a search results display, including a variety of reputation indicators, for a user interface of a social networking community, according to an embodiment of the invention.

FIG. 4 illustrates a search results display, including a variety of reputation indicators, for a user interface of a social networking community, according to an embodiment of the invention. The search results display illustrated in FIG. 4 includes a variety of information about a member of the social networking community. In one embodiment of the invention, the information displayed may include information from the user's profile, including, but not limited to, information relating to: the member's career (e.g., current or former title, employer, and/or industry), the member's education (e.g., schools attended, degrees received), areas of interest, and a wide variety of other information. In one embodiment, the search results display may include a digital photograph or picture of the member. In addition, according to one embodiment of the invention, a variety of reputation indicators for various reputation categories may be displayed. For example, in the particular search results display 56 illustrated in FIG. 4, reputation indicators for the following categories of reputation are displayed: network indicator 58, endorsement indicator 60, access indicator 62, activity indicator 64, and verification indicator 66.

One category of reputation indicators, which was briefly described above, is a member connections category. Accordingly, the member connections category is an indicator of reputation based on the number of direct connections a particular member has established with other members of the social networking community. The member connections reputation indicator is one measure of the member's reputation within the network. In another embodiment of the invention, the member connections category may be referred to as the network reputation indicator, or network indicator 60. Accordingly, the network reputation indicator 60 may be based on considerations other than the number of direct connections a particular member has established with other members of the network.

In one embodiment, the network reputation indicator 60 is based on a more complex analysis of a member's network connections. For example, in one embodiment of the invention, the aggregate score for a member's network reputation indicator 60 may be based on any one or more of the following:

Seniority of positions of direct (first degree) and extended contacts (2nd, 3rd, and 4th degree contacts).

Measures of influence of the member's direct and extended network.

Diversity of the member's direct and extended network.

Overall, aggregated measures of the member's direct and extended networks.

These various factors, in addition to the number of direct connections, may be given different weights and combined to arrive at a member's aggregate score for a network reputation indicator 60, as described above.

In one embodiment of the invention, the system allows each viewer to customize the particular function or formula used to arrive at an aggregate score for one or more reputation indicators. For example, for each type of aggregate score related to a particular category of reputation, a viewer may customize the score in order to emphasize factors of most interest to the viewer. If a viewer is especially interested in finding targets (e.g., other members) with high network strength related to a particular industry or industries, the user will be able to make those kinds of customizations. Alternatively, if the user is most interested in finding targets with rich access to senior-level contacts with high influence, those types of customizations may be made.

Similarly, each type of aggregate score associated with a particular category of reputation may be automatically customized to reflect typical interests related to particular kinds of searches. For example, the behavior of users of the system may reveal that users searching for software engineers care less about finding targets with high-influence networks than do users searching for business development candidates. Customizations in the algorithms employed to calculate aggregate scores may thus be derived from various data collection methods, including explicit user testing and analyzing user behavior on the system.

Referring again to FIG. 4, another category of reputation for which a reputation indicator is displayed on the search results display is endorsements. The endorsement indicator 62 (e.g., the checkmark in FIG. 4) represents a measure of reputation derived from an analysis of endorsements and references provided by other members of the social networking community. For example, in one embodiment of the invention, a member may endorse another member, or refer a member. The endorsement or reference may be broad and general in nature, or, alternatively, the endorsement or reference may be associated with a particular aspect (e.g., a service or product) of the member. In one embodiment, the endorsement reputation indicator 62 is displayed only when a member has at least one endorsement or reference. In addition, in one embodiment of the invention, additional information may be displayed along with the icon for the endorsement reputation indicator 62. For example, in one embodiment, a simple score showing the number of endorsements received by the user may be displayed. In addition or as an alternative, a more complex aggregate score may be calculated and reported to reflect a combination of factors, such as:

A summary score of endorsement ratings provided by endorsers.

The aggregated reputation scores for endorsers.

Analysis of reputation of endorsers' direct and extended networks of contacts.

Measures of independence and objectivity of endorsers derived from network analysis.

Measures of extent of endorsers' qualifications and relevance to the type of search conducted by the viewer.

Measures of closeness of endorsers' relationship to the viewer.

In one embodiment of the invention, as illustrated in FIG. 4, the search results display includes a reputation indicator representing the level of access a member has to another member. Accordingly, such a reputation indicator may be referred to as an access indicator 64.

One of the main advantages of social networking systems for enhancing reputation information is that social networking systems not only provide unique reputation metrics, but they also help users gain trusted access to additional information they need to complete their evaluations. For example, if two members have a common friend, and each member has established a direct connection to that friend via the social networking system, then there may be an inherent level of trust between the two members via their common connection to their friend. The common friend provides a path of trusted connections between the two members, and accordingly, the trust and potential forthrightness between the two members is likely to increase. Consequently, the social networking system may prove a powerful tool in providing one member with trusted access to another member. Of course, this may also provide each member with access to the other member's network. The access indicator 64 allows a viewer to quickly see how closely connected he or she is to a target, endorsers of the target, and other likely references. For example, the social networking system may also be a powerful tool that provides the viewer with trusted access not only to the target, but also to other people who know the target and who would be willing to act as a reference, including people who have publicly endorsed the target, as well as those who have not.

The factors that may be included in an algorithm for computing an aggregate score for an access reputation indicator 64 include, but are not limited to, the following:

Closeness of a viewer to a target.

Closeness of a viewer to endorsers of the target.

Closeness of a viewer to likely references for the target, for example, people who may know the target because of being employed in the same company or due to other likely relationships.

The algorithm for calculating closeness may include a combination of any one or more of the following factors:

Degrees between viewer and the other party.

Measures of strength of relationship between parties in the connection path between the viewer and the other party.

Measures of strength of relationship between parties that includes one or more connections due to common group memberships, especially group memberships where members of the group give special access to other members of the group on the basis of group affinity, even without establishing a direct connection path between them.

Whether the other party to which the viewer is connected is the target, an endorser, or a likely reference.

To further illustrate how access reputation indicators 64 may be utilized in a social networking scheme, table 1 (below) illustrates several different relationships between a viewer and a target that can be used to obtain reputation-related information.

TABLE 1

1. V ◄——► C ◄——► C ◄——► T (V 3 degrees from T)

2. V ◄——► C ◄——► C ◄——► E (V 3 degrees from E)

3. V ◄——► C ◄——► C ◄——► T (V 3 degrees from both T and E.)
   ↘
   C ◄——► C ◄——► E 4. V ◄——► AC ◄——► C ◄——► (V connected to T via a Group Contact)

5. V ◄——► C ◄——► C ◄——► LR (V 3 degrees from Likely Ref.)

V = Viewer; C = Connector; T = Target; E = Endorser; AC = Affinity Connector; LR = Likely Reference In Table 1, the first example illustrates a viewer connected to a target through two other members, referred to as connectors. Consequently, in the first example, the viewer is considered to be three degrees from the target. Similarly, in example two, the viewer is three degrees from an endorser. In the third example, the viewer is shown to be three degrees away from both the target and the endorser. In the fourth example, the viewer is connected to a target via a group contact. For example, the viewer may not have established a direct connection to the target, but instead the viewer may belong to one or more of the same organizations, clubs, or groups, as the target. In example five, the viewer is shown to be three degrees away from a likely reference.

In one embodiment of the invention, an aggregate score for an access indicator 24 may be based on one or more of the following factors:

Count of the number of degrees in shortest path between the viewer and the target.
  Count of the number of degrees in the shortest path between the viewer and an endorser.
  Count of the number of degrees in the shortest path between the viewer and a likely reference.
  If any of the above counts is 3 degrees or less, or if two or more of the above counts are 4 degrees or less, then display the Access icon in the reputation summary display.

The above algorithms may be adjusted to introduce other factors as well. For example, in one embodiment of the invention, an affinity group connection may be given the same weight as a direct connection. An affinity group connection may exist where two members of the social networking community are also both members of the same group, and each member has agreed to provide access to other members within the group.

An example of a more complex algorithm combining some of the factors described above is as follows:

Find all connection paths between target and viewer. Strongest paths are those that have the highest minimum strength of connection between any two connecting parties in the chain.
  If necessary adjust numeric values for closeness and strength of connections such that fewer degrees and stronger connections are higher than more degrees and weaker connections. For example, if there is a possibility for up to 4 degrees of connection (closeness) and 4 measures of strength of relationship (including a common affinity group membership as one of these measures of strength of relationship), use the following valuations shown in table 2 (below):

TABLE 2

| Degrees | Closeness Value | Strength | Strength Value |
|---|---|---|---|
| 1 | 10 | High | 10 |
| 2 | 8 | Medium | 7 |
| 3 | 5 | Affinity Contact | 5 |
| 4 | 3 | Everyone else | 3 |

For each path found, multiply the closeness value by the strength value to get an overall access score for that path. For example, if the closeness value is 8 and the strength value is 7, the access score would be 56 compared to the maximum score of 100.
  Calculate an adjusted access score by taking the highest access score among all the paths found and multiplying this by a factor that increases the access score by up to 50% based on presence of multiple paths that are same strength or within 75% of the same strength.
  Repeat steps 1 through 4 for each other type of connection, (i.e., between viewer and a) endorsers, and b) likely references). For likely references it will first be necessary to find all likely references and then find paths between viewer and likely references.
  Combine adjusted access scores for each type of connection by adding them together with an adjusting weight applied to each. For example, the adjusting weight for access directly to the target or endorsers may be 1, for access to likely references, the adjusting weight may be 6.
  Adjust weights and scores described above based on a) explicit user preferences, or b) automated analysis of relevance across clusters of similar users and types of searches.

In one embodiment of the invention, access reputation indicators 24 may indicate a particular relationship between two members. For example, the aggregate score representing an access indicator level may increase, not only when two people have a close connection path, but also when they have common interests, backgrounds, or other indicators of affinity. In one embodiment of the invention, some affinity indicators also serve to act as an extra type of endorsement. For example, people who have graduated from highly regarded universities may evaluate others more highly if they have graduated from the same university, or other universities with similar reputations. As another example, people who have been active in supporting certain social causes may have a higher level of trust and empathy for others who have similar interests and experiences.

In one embodiment of the invention, when a viewer looks at another member's profile or performs a search for other members, the system will automatically search for a match on likely affinity attributes, such as schools attended, group memberships, active social causes, and/or personal and professional interests. In one embodiment of the invention, an affinity reputation indicator may be related to an access indicator, but it will not affect the overall aggregate score for the access indicator. Instead, if there is at least one indicator of affinity between the viewer and another member's profile, an affinity indicator will be displayed along with the access indicator. In another embodiment, a matching affinity attribute affects (e.g., increases) the aggregate score for the access reputation indicator 24. For example, as illustrated in the example user interface of FIG. 3, the affinity indicator may appear as a hyperlinked text string, such as the link 36 that reads "What you and Jane have in common".

In one embodiment of the invention, a reputation indicator reflecting a member's activity within the social networking community may be displayed. For example, such a reputation indicator may be referred to as an activity indicator 26. Activity by individuals within the social networking system may give important clues regarding reputation and overall reliability. When properly analyzed and filtered, these clues may, when presented to a viewer, allow the viewer to make the following kinds of decisions regarding the actions of a particular target:

Does the member's activity suggest the member may have a good reputation and be highly influential?

Does the member's activity suggest the member may be responsive, and thus likely to accept or forward requests from others in the member's network?

Does the member have a completed profile, including information that is up-to-date?

Is the member in good-standing with the social networking community and respectful of community rules of behavior?

Analysis of members' activity may also provides the social networking system with metrics that can be used to automatically weight and sort multiple search paths to a target. For example, if a search returns a target person who matches the search and also indicates that there are multiple paths between the searcher and the target, then analysis of the prior activity of members who are represented in the various search path options can be used to rank the search paths based on which are most likely to be successfully forwarded by the intermediary connectors and accepted by the target.

In one embodiment of the invention, several types of activities may be measured and analyzed, including, but not limited to: invitation behavior (e.g., actions related to inviting, accepting, declining, and ignoring invitations), request behavior (e.g., actions related to sending, forwarding, declining to forward, accepting, declining to accept, and/or ignoring requests), searching, viewing user profiles, completing user's own profile, sponsoring advertisements on the system, sponsoring advertisements that are frequently clicked on, and/or upgrading to, and being accepted for, premium services on the system. In one embodiment, activity may then be monitored and collected when a user is either the actor or the object of the action (e.g., has been invited by another user, or has had an invitation accepted or declined by another user).

In one embodiment of the invention, various factors may influence the aggregate score for an activity indicator 26. For example, in one embodiment, the factors, or measures, that affect the activity indicator 26 may be broken down into the following categories: 1) factors that reflect or indicate influence, 2) factors that reflect or indicate reputation, 3) factors that reflect or indicate responsiveness, 4) factors that indicate complete and current information in a user's profile, and 5) factors that indicate whether a user is abiding by, or not abiding by, the rules of user conduct. The following lists several factors, broken down by the categories suggested above, that may be given weight in a function or formula for an aggregate score for an activity indicator 26:

Factors that reflect or indicate influence:
The frequency with which a user is invited to establish a direct connection with another member.
The adjusted percentage of invitations accepted.
The frequency with which a user receives requests from other members.
The number of times a user's profile is viewed by others within a various time period.
The frequency with which a user is asked to forward a request.
The frequency with which a user is asked to forward requests when there are multiple paths to a target.

Factors that reflect or indicate reputation:
Evidence that a target's contacts and endorsers are discriminating when making 'trusted' connections with others (e.g., declines some connections).
Evidence that a target's contact, who has forwarded a request to the target, is generally discriminating about which requests to forward (e.g., doesn't forward nearly all requests received from all connections).

Measures that indicate that a target is responsive:
Frequency of accepting, declining and ignoring invitations.
Frequency of forwarding, declining, and ignoring requests.

Factors that indicate complete and current information in a user's profile:
Length of description of current position and specialties (e.g., above a minimum).
Number of current and prior positions provided.
Education section completed.
Date of last update to contact information entered by user (including current company and position).
Comparison of contact information completed by user to date and contents of contact information contributed by other users.

Evidence that user is abiding by, or not abiding by, the rules of user conduct:
Frequency of complaints received.
Number of people who have broken connection with person.
Number of investigated and upheld complaints.
Evidence that a user has invited people to connect whom the user doesn't know.
Spamming other users (e.g., using the social networking community to find people and then sending unsolicited messages not through the social networking system).
Data-mining (high-volume searches and little else)
Being a robot (very high-volume searches and other activities)
Verified posting of offensive content.
Being abusive toward other users.

As with other reputation indicators, not all of the above factors need be included in determining the aggregate score for the activity indicator 26, and/or whether to display an activity indicator 26. In various embodiments of the invention, the formula for determining the aggregate score, as well as the lower threshold value that may be used to determine whether an activity indicator 26 is displayed, will vary. In one embodiment, the lower threshold and aggregate score will be based on a combination of an analysis of user behaviors and implied preferences, as well as explicit user preferences.

Another reputation indicator that may be utilized in an embodiment of the invention is a verification indicator 28. A verification indicator 28 may indicate the extent to which information that has been provided by a particular user has been verified, for example, by a third party. For example, in one embodiment, the verification indicator 28 will be based on an aggregate score that takes into consideration various types of verifications, including those similar to the following examples:

A social network analysis showing that an individual and that individual's network have a high probability of being real. The score used depicts a level of confidence, from 1% to 100%. If the confidence level is 70 or higher, confidence will be reported as "High", and otherwise the score will not be included in the aggregate "Verified" score.

Email confirmation of profile by references provided by user. A "High" score for this will be reported if over 50% of references respond positively and none respond negatively for example, if there is no evidence of significant inaccuracies.

Third-party verification of basic contact and current employment information. A positive confirmation with no reported significant inaccuracies will generate a "High" score for this measure.

Third-party verification of full resume, including employment history, education and professional certifications. A positive confirmation with no reported significant inaccuracies will generate a "High" score for this measure.

Authenticated member of an authenticated group related to user's profession. If user is an authenticated member of at least one such authenticated group, a "High" score will be generated for this measure.

Authenticated member of another authenticated group. If a user is an authenticated member of at least one such authenticated group, a "High" score will be generated for this measure.

Publications, including material the user has written, or in which a user has been interviewed or cited. A "High" score will be given for the publications measure if the user's profile has listed at least 3 publications, or at least 1 publication with an audited count of over 10,000 readers or subscribers.

a. In one embodiment of the invention, the verification indicator 28 may be displayed when any one or more of the above verification measures has a "High" level, or value. In an alternative embodiment, the verification indicator 28 may have a variety of intensities. For example, the verification indicator value may have different icons for different levels of aggregate score. Accordingly, if only one measure from the above list has a value of "High" then an icon representing the lowest level of verification may be presented. However, if several measures from above have "High" levels, then an icon representing a higher level of verification may be displayed. Furthermore, in one embodiment, the icon or graphic for the verification indicator may vary if the verification is from a third party, acting in independence. Moreover, in one embodiment of the invention, the aggregate score for the verification indicator 28 may be customized by explicit user preferences, for example, if a user indicates that some measures should receive higher, lower, or zero weight in calculating the aggregate verification score. In addition, the aggregate score may also be customized by analysis to calculate weights assigned to verification scores for various types of search objectives or other objectives.

In one embodiment, any of the underlying values (e.g., rating or score) associated with a reputation indicator described herein may also be used as a parameter or search criteria in a search. That is, when performing a search for a person having particular attributes, the searcher may specify that the potential target have a reputation score or rating that exceeds a particular threshold, or is within a particular range. For example, a searcher may specify as search criteria a desired minimum number of direct connections that a user has established. Accordingly, only users of the social networking system who have established the desired minimum number of connections will satisfy the searcher's search criteria. Moreover, any one of the previously described scores or ratings associated with a reputation indicator may be used as search criteria in a user's search.

Detailed Display of Reputation Indicators

In one embodiment of the invention, after a viewer has identified a target of interest in a search results display 16 such as that illustrated in FIG. 2, the viewer may select a link (e.g., a hyperlink) to view detailed information about one or more of that target's reputation scores associated with the target's reputation indicators. For example, the viewer may select the "VIEW REPUTATION DETAILS" link 30 shown in FIG. 2. Accordingly, a reputation indicator details page 32, such as that illustrated in FIG. 3 may be shown to the viewer.

As illustrated in FIG. 3, a detailed reputation indicator display 32 includes detailed information about various reputation indicators and their underlying aggregate score. For each type, or category, of reputation indicator, additional information, including links to yet greater detailed information, is displayed. Each reputation indicator shown on the display in FIG. 3 corresponds with a reputation indicator illustrated in the search results display illustrated in FIG. 2. Furthermore, for one embodiment of the invention, for each reputation indicator, or section, shown in FIG. 3, one or more items may be selected (e.g., clicked with a pointer device) to generate a new view (e.g., open a new window) focusing only on that section/indicator (e.g., Connections and Networks; Endorsements and Endorsers; etc.). Moreover, for one embodiment, one or more sections of the display illustrated in FIG. 3 may include one or more sub-sections, and in some cases summary scores for those subsections. For example, a sub-section may exist where an aggregate score is based on several measures. Each sub-section may be associated with a measure that makes up part of the aggregate score. For one embodiment of the invention, reputation indicators will only be displayed if the underlying aggregate score for the indicator is over a threshold level needed to report the reputation indicator.

Referring again to FIG. 3, for one embodiment of the invention, when a user selects (e.g., clicks) on an interactive link under one of the section headings, the user may be directed to a new page, specific location on the page, or a section of a page focusing on the corresponding indicator or sub-indicator. In one embodiment of the invention, the details page for each indicator/sub-indicator may include:

Details and scores for each sub-measure, or factor, that is used to determine the aggregate score for that indicator.

Explanations or links to explanations regarding how a sub-score or aggregate score is calculated.

Interface items or links to a new page where the user can customize the algorithms for calculating scores and displaying indicators (e.g., by adding, removing, or changing the weights applied to sub-section indicators).

In one embodiment of the invention, each reputation indicator is displayed along with additional information. For example, in the "Connections and Network" section, summary information may be displayed related to a user's level of seniority. In one embodiment of the invention, a table may be displayed showing how much experience the user has had in different levels of seniority during the past five years, and simultaneously showing the level of prestige of the user's organization as indicated by organization size and/or other measures. For example, in one embodiment, a table such as table 3, below, may be shown:

TABLE 3

| Within the last five years: | |
|---|---|
| CEO/President | 2 years in organization with 50-100 employees |
| CXO/EVP/SVP | 3 years in organizations with 1000-5000 employees |

In one embodiment of the invention, a link may be included for additional information related to the level of diversity of a user's network. Information about a user's network diversity may be displayed as illustrated in table 4 (below):

TABLE 4

| Diversity parameter | 1st degree Connections | 1st and 2nd Degree connections | User's Total Network |
|---|---|---|---|
| Industries | # and % | # and % | # and % |
| Industry with most contacts. | Information Technology | Information Technology | Information Technologoy |
| Industry with next most | Finance | Accounting | Legal |

A user performing a search may also like to know how rich and influential a profiled user's network is in a few particular parameters that the searcher is interested in. For example, the searcher may be looking for business development specialists in the aerospace industry, so the search will especially be interested in the richness and influence of a profiled user's network related to that industry.

In one embodiment of the invention, the profiled user's network strength will be automatically calculated for parameters specified in the searcher's search instructions. For example, if a search is performed for aerospace engineers in Denver, then the number and percentage of the user's contacts, by degree, will be shown for aerospace engineers, and for people living in Denver. Accordingly, this automatic calculation and display will be augmented by a search tool for displaying a user's network for a particular parameter. For example, the user may enter an industry, profession, or location and see the number and percentage of contacts among a user's mutual connections, endorsers, 1st and 2nd degree connections, and entire network. This allows a searcher to take a look at the user's connections and endorsers within a specific parameter related to the searcher's interests.

Additional information may be displayed in the "Endorsements and Endorsers" section as well. For example, in one embodiment, the following information may be displayed, in table format, or otherwise:

Endorser's name (and link to more information about endorser, including endorser's own reputation)
Position endorsed
Relationship to profiled user
Relationship to the current viewer (Searcher)
Endorsement date
Link to endorsement text
Rating (if available)
Endorser's own reputation score
Endorser's independence score (independence from profiled user and other endorsers)

In one embodiment of the invention, particularly when additional information is displayed in a table format, a user may be able to easily customize the view of endorsement data by the following methods:

Sorting or filtering the table based on contents of any of the columns in the table.
Clicking on a button or link ("Endorsements related to your search") to only show endorsers that had a relationship to the endorsed that is related to the viewer's purpose. For example, if the viewer is looking for a consultant, then the viewer will be especially interested in endorsements by clients; and if the viewer is looking for a an employee, the viewer will especially be interested in endorsements by supervisors or peers of the profiled user.
Clicking on a button or link ("Endorser's Close to You") to only show endorsers that are within a specified degree of connection to the Viewer.

In one embodiment of the invention, along with the reputation indicators, there may be displayed a section (e.g., the "Take Action" section illustrated in FIG. 3) associated with various actions the viewer can take. In one embodiment of the invention, a link may be displayed that allows the viewer to make contact with the target or one or more endorsers. For example, if a network analysis reveals one or more close endorsers, a section may be displayed allowing the user to initiate contact with one or more of these endorsers. In one embodiment, the interface may show what methods for contact are available, for example:

Request contact directly with the endorser (if permitted by the endorser and/or the person endorsed).
Request contact through the person endorsed.
Request contact through a chain of connections between the viewer and the endorser, with options of choosing connection paths that will not go through the endorsed, or that will go through the endorsed.

The interface may also include sample text to include in a message to the endorser, with data automatically filled in to let the endorser easily see who the sender (e.g., searcher) is, who the person endorsed is, and what the nature of the search is.

Thus, methods and systems for reputation evaluation of online users in a social networking scheme have been described.

What is claimed is:

1. A computer-implemented method for measuring reliability of a reputation for a target member in a social networking system using a server device the method comprising:
   storing one or more endorsements for the target member, the endorsements having been created by endorsers of the target member;
   in response to a search for which the target member is a search result, displaying a profile of the target member, the profile including the endorsements for the target member, information regarding endorsers' relationships with the target member, and displaying information regarding a searcher's relationship with the endorsers;
   measuring, with the server, using social networking analysis, accuracy of the endorsements; and
   determining a rating for the target member based on the measure of the accuracy of the endorsements
   displaying the rating for the target member.

2. The method of claim 1 wherein the social networking analysis takes into account one or more of the following:
   an average of all endorsements;
   an average of sealed endorsements;
   an aggregate weighted score for independence of the endorsers;
   an aggregate weighted score for relationships of the endorsers to the searcher; and
   an aggregate weighted score for endorsements of the endorsers.

3. The method of claim 1, wherein the social networking analysis includes ranking the endorsements based on one or more of the following:
   people who list the target member as a direct connection and worked in any listed organizations concurrently with the target member;
   people who list the target member in their address book and worked in any of the listed organizations concurrently with the target member;

people who list the target member either as a direct connection or in their address book and who worked in any of the listed organizations within a defined time period;
people who worked in any of the listed organizations within the defined time period; and
people who have listed people in their address book who now work in any of the listed organizations.

* * * * *